May 2, 1939.　　　　　　　A. MADLÉ　　　　　　　2,157,065
VARIABLE SPEED POWER TRANSMISSION CONTROL
Filed Oct. 25, 1933　　　　3 Sheets-Sheet 1

INVENTOR
Alain Madlé,
BY
ATTORNEY

Patented May 2, 1939

2,157,065

UNITED STATES PATENT OFFICE 2,157,065

VARIABLE SPEED POWER TRANSMISSION CONTROL

Alain Madlé, Bristol, Conn., assignor, by mesne assignments, to Mildred S. Reisman, New York, N. Y.

Application October 25, 1933, Serial No. 695,145

17 Claims. (Cl. 74—190.5)

My invention relates in general to systems of power transmission and in particular to means for controlling the speed ratio of variable speed power transmissions.

In one of its aspects it relates to the automatic setting of the speed ratio under given conditions of power input into the prime mover associated with the transmission.

From other aspects, it relates to the automatic setting of the speed ratio to such a point that if the power flow to the prime mover is interrupted, restarting may be effected under the most favorable conditions. In another aspect it relates to the automatic resetting of the ratio when the prime mover is restarted to its setting before the prime mover was stopped. In still another aspect it relates to control of the speed ratio by hydraulic means.

While my invention has herein been disclosed in relation to power transmissions and in particular to transmissions used in connection with electricity as a motive power, it is to be understood that as to certain phases thereof it may have application for other purposes and in particular to control power transmissions used in connection with other sources of power than electricity such, for example as steam or water power.

Among the objects of my invention, therefore, is the provision of hydraulic means of controlling the speed ratio of a power transmission mechanism and particularly of a power transmission of the type in which the speed ratio is continuously variable, such as one where power is transmitted from a driving race to a driven race by means of rolling bodies in adhesive frictional driving contact therewith, and in which, for purposes of varying the speed ratio of power transmission, the axes of the rollers are tiltable in relation to the races.

A further object is the provision of means for automatically setting the speed ratio to its point of lowest speed transmission when the flow of power into the prime mover is interrupted and the prime mover stops, whereby starting of the prime mover after such stoppage is made easy.

A further object of my invention is the provision of means for automatically resetting the speed ratio to its initial figure when the power is turned on again after having been interrupted.

Still another object of my invention is the provision of means for preventing stalling of the prime mover due to excessive load requirements, by automatically controlling the ratio setting in accordance with the power demand; that is, when the load increases and thereby the torque required of the driving member is increased, the speed ratio will be changed to a lower point, whereby its multiplying effect on the torque of the prime mover is increased, so that a prime mover of limited power may continue to drive the load, but at a reduced speed; and, conversely, when the torque requirements decrease, the speed ratio will automatically return to a higher figure, with an increase of load speed.

I attain these objects of my invention by the provision of a hydraulic ratio setting device, that is manually controllable under normal conditions, and by the provision in conjunction therewith of control means responsive to predetermined conditions in the power line to set the speed ratio of the power transmission to its lowest figure, and in particular for effecting said lowest ratio setting whenever the input of power into the prime mover fails, and for restoring the initial ratio setting whenever the input of power into the prime mover is reestablished. I further provide means for reducing the ratio setting whenever the flow of power into the prime mover exceeds a predetermined maximum and for automatically restoring the ratio setting to its original position whenever the flow of power, after exceeding such maximum, again drops below it.

For the attainment of the above objects and of such other objects as will hereinafter appear or be pointed out, I have shown several illustrative embodiments of my invention in the drawings, wherein.

In the operation of power mechanism in which a load is driven by a prime mover, it is well understood by those skilled in the art, that the power demands made upon a prime mover when starting against the resistance of the normal full load are very great. In many cases the installation of a prime mover of vastly greater power than required for ordinary operating conditions is necessitated. Under such conditions it is customary wherever possible to start the prime mover light; that is, either entirely detached from the load or under a part of the full load only. Where this is not possible, however, the same result may be attained by installing a variable speed power transmission between the prime mover and the load, and to start the prime mover with the trarnsmission set for a low ratio, so that, with the greater multiplication of torque thereby provided, a relatively small prime mover may overcome a relatively great torque needed to start the load. After the load is in motion the speed ratio may be gradually increased, until the ratio best adapted for attaining proper efficiency of normal operation is attained.

In the practical operation of systems such as the one just described, in which a prime mover drives the load through an intermediate variable speed ratio transmission, it frequently happens that the attendant who is in charge of the installation forgets to set the speed ratio to the low figure required for starting, and in attempting to start the prime mover against the full load thereby imposed on it in starting, it frequently happens that the prime mover is damaged.

Figure 2:
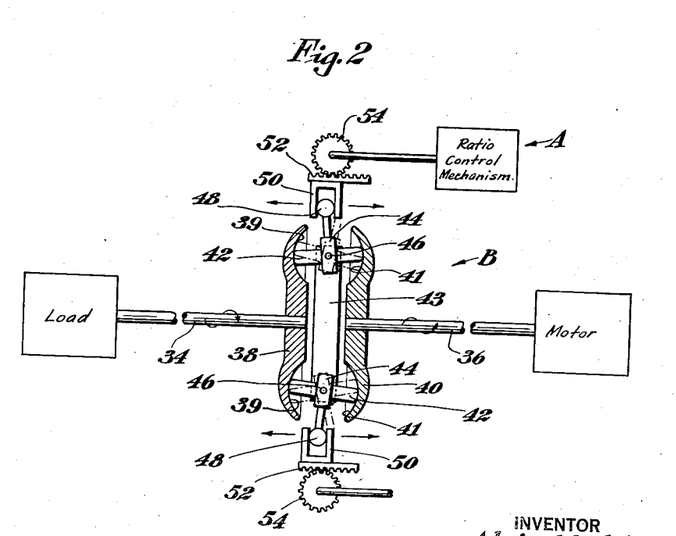
Figure 2 is a diagrammatic view showing a simple form of power transmission to which my invention is particularly applicable.

A further problem presents itself where the speed ratio transmission is of the type illustrated diagrammatically in Figure 2. It is practically impossible to adjust the speed ratio in such a transmission unless the parts thereof are in motion, and if the motor should stall, as when the power input into the prime mover is interrupted, there may be no opportunity for the attendant to set the speed ratio to the lowest figure required for starting the prime mover again. Under such circumstances it is frequently impossible to start the prime mover without tedious and costly manipulation of the parts of the transmission.

My invention solves these problems in a very convenient way by automatically effecting a setting of the speed ratio of the transmission to its lowest figure, such as will be suitable for starting of the prime mover, whenever the prime mover stops as a result of the total or partial interruption thereinto of the power input. In the case of electric power, this would occur if the line switch is thrown off or if the line fuses blow, or if there is a short circuit in the power line and therefore insufficient current enters the prime mover to operate it. By applying my invention to such system, the human factor, with its attendant, uncertainties is completely eliminated.

Another condition causing trouble occurs when the load increases to such an extent that unless the power transmission ratio is sufficiently reduced, the prime mover would stall because of lack of power. As such increases in load would occur suddenly and unexpectedly it would be impossible to depend upon an attendant for regulating the transmission ratio. To provide against this contingency, I use means located directly in the power line and operating when the flow of power into the prime mover exceeds a predetermined maximum, to act on the means previously described for controlling the ratio of transmission in the same way as does the interruption of the power line. This means is so arranged that when the power drops below this predetermined maximum, said previously described means will again operate to restore normal ratio conditions, as will be further explained hereinafter.

Assuming that for some reason the power flow to the prime mover has been interrupted, and, the trouble having been overcome, the prime mover is again started on a low transmission ratio, it will obviously be desirable to set the transmission ratio again to the figure at which the prime mover was previously operating efficiently. In ordinary power transmissions in which the ratio may be varied, this resetting to the original condition would have to be done manually by the attendant. My invention obviates such manual setting by the provision of an automatic resetting mechanism, making manipulation by the attendant entirely unnecessary.

My invention further provides for effecting the ratio setting hydraulically, and thereby mechanisms requiring great power for adjustment may be controlled by delicate control means, whether manual, or automatic means, responsive to certain conditions, such as thermostatic control means, delivering only a small amount of power for purposes of ratio setting.

Figure 1:
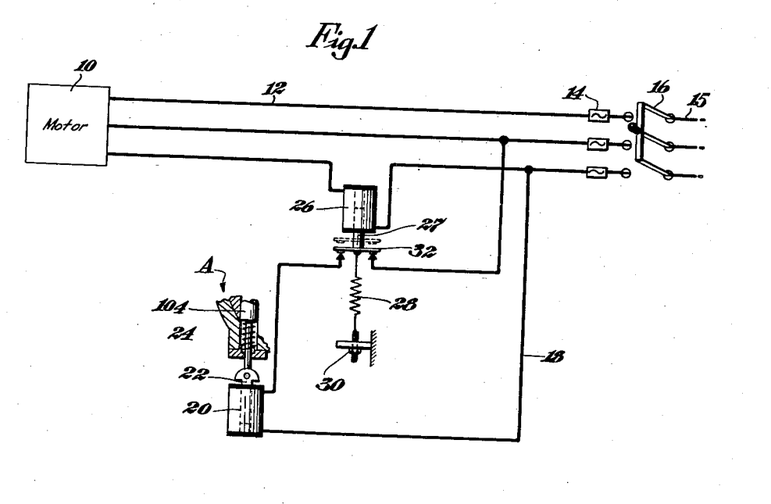
Figure 1 is a diagrammatic view showing a power system with my invention applied thereto, as a whole.

Referring now to the drawings in detail, and particularly to Figure 1, it will be observed that I there show a prime mover 10, which by way of example has been shown as an electrical motor of the three phase, alternating current type, 12 indicates the conductors, fused at 14, for supplying current to the motor 10, and adapted to be connected to the main power line by a switch 16. A branch power line 18 is applied across two of the conductors 12, and is connected to the solenoid 20 which, when energized, draws the armature or plunger 22 against the pull of a spring 24. The armature 22 is connected to hydraulic control means for the ratio setting mechanism of the transmission, which control means is designated as a whole by A, and the details of which will be hereinafter described. It is sufficient at this point to remark that when the voltage across the two conductors 12 to which the branch line is connected is sufficient to energize the solenoid so that its pull on the armature 22 overcomes that of the spring 24, the action of the solenoid will serve to set the ratio of transmission as determined by the previous manual setting of a control means to be later described. When, however, the voltage on the line 18, and consequently the current in the same, drops below a predetermined minimum which is insufficient to energize the solenoid 20 to pull the armature 22 against the action of the spring 24, the latter will control the position of the armature and the hydraulic control A will be effective to set the transmission to the lowest possible ratio. Such conditions in the branch circuit 18 may be brought about by the complete interruption of the power input, as by throwing the switch 16 or by the blowing of fuses 14, or it may be brought about by a partial interruption of the power input, as by a short circuit in the power line 15 and a consequent dropping of the voltage on conductors 12, without, however, completely cutting off the power. It will be understood that the solenoid 20 then becomes operatively active when the voltage across the conductors of circuit 18 exceeds a predetermined minimum and becomes operatively inactive when such voltage drops below said predetermined minimum.

It has already been mentioned that it may happen that with an increase of load the motor may stall. This would result in an annoying interruption of the operation of the system, and if in addition the fuses failed to blow, the motor might be seriously damaged. To prevent such occurrence, I provide against overload conditions by inserting a solenoid 26 in one of the conductors 12. The pulling power of this solenoid on its armature or plunger 27 is therefore dependent on the current passing into the motor.

The pull of the solenoid 26 on the armature 27 is resisted by a spring 28, the pull of which may be adjusted by any suitable or preferred means such as the screw and nut adjustment indicated at 30. The switch 32 is shown in the branch circuit 18 and its moving parts are carried by the armature 27. Under normal operating conditions this switch is intended to be in closed position, and to be held there by the pull of spring 28, but when the current in the solenoid 26 exceeds its predetermined maximum, the pull thereof will overcome that of the spring, and the switch 32 will be opened, thereby re-energizing the solenoid 20, and causing it to affect the hydraulic ratio setting mechanism A just as though the main power line had been de-energized. The current value in conductor 12 at which the switch 32 opens may obviously be controlled by adjusting the tension of spring 28 by the adjusting means 30 just described.

Passing now to the consideration of the power transmission mechanism, reference is to be had to Figure 2, in which a transmission is indicated as a whole by the letter B. As has been previously mentioned, because of the obvious advantages of my invention when used in connection with a variable speed power transmission of the adhesive contact race and roller type, I have selected a simple form of that type of transmission for purposes of illustration of the application of my invention to power transmissions in general.

In Figure 2, 34 and 36 illustrate a pair of shafts, one of which is intended to be the driven shaft, and the other the driving shaft, and as indicating such relation, a motor and a load have also been symbolically shown. Each of said shafts carries one of a pair of races 38 and 40, provided respectively with toric driving surfaces, 39 and 41. Member 43, intermediate the races, carries a set of rollers, 42, adapted to contact in driving relation with the toric surfaces heretofore mentioned. The rollers 42 are journalled in frames 44 and these frames 44, are adapted to tilt about the axes 46 perpendicular to the plane of the paper. Said frames as they tilt, carry with them the rollers 42, which may thereby be tilted into various positions in relation to the races, as indicated by dotted lines in Figure 2. Each such position corresponds to a different ratio setting. Extensions 48 are provided on the frames 44 and engaging members 50 are provided by means of which the extensions 48 may be moved in either direction, to tilt the frame 14 and the rollers carried by them, thereby altering the speed ratio of the transmission. Members 50 carry rack 52, engaged by pinion 54; said pinion being actuated by the hydraulic ratio control mechanism A as will be hereinafter described. It is to be understood that all of the rollers 42 are tilted simultaneously.

So far my description has dealt with the general features of my system, and in particular with the features thereof that are controlled by the power input, and I have further described the salient features of a form of power transmission which is adapted for control of the type described. It remains to describe the features of the hydraulic transmission by which control of the ratio setting may be effected either automatically, in accordance with power input conditions within the system, or manually, or otherwise in response to conditions extraneous to the system.

Figures 3, 4, 5:
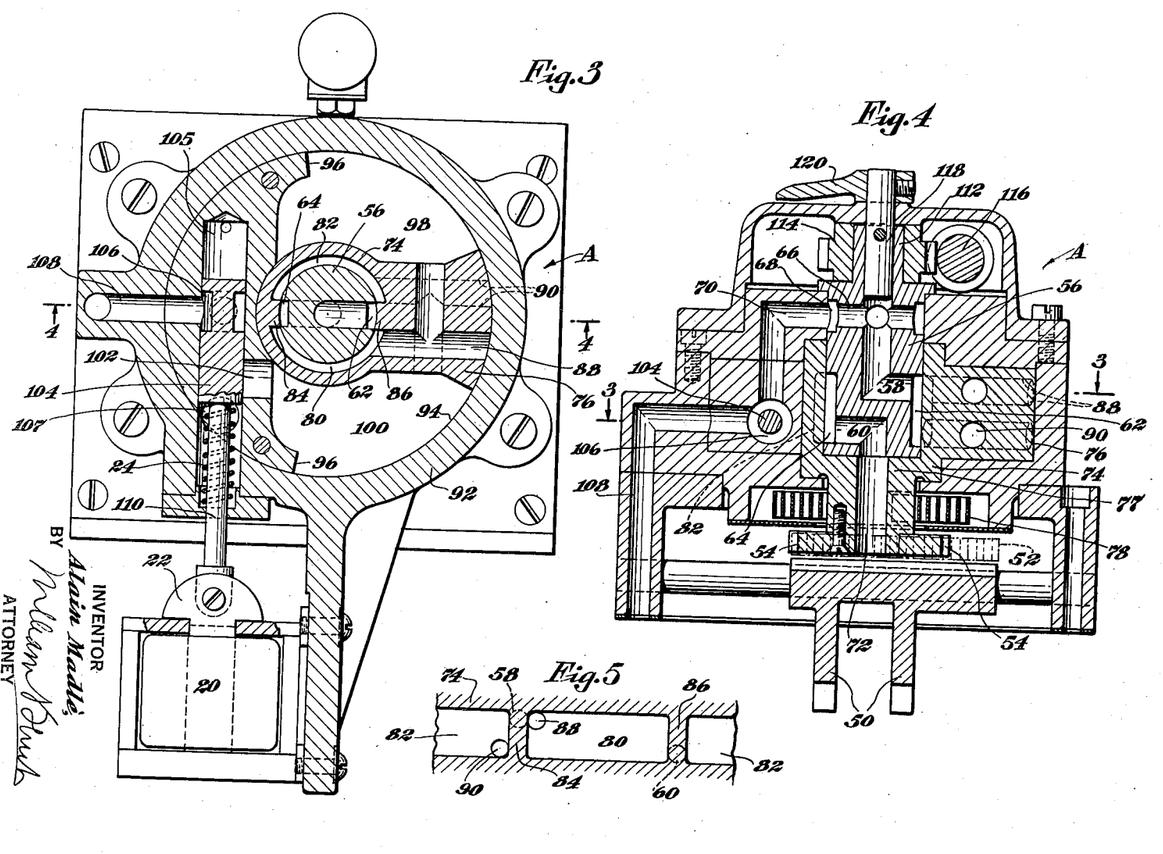
Figure 3 is a side view, in section, on the line 3—3 of Figure 4 looking in the direction of the arrows, of a hydraulic ratio setting mechanism with an automatic control for the same, such as is adapted for the setting of a power transmission such as illustrated in Figure 2.
Figure 4 is a transverse sectional view on the line 4—4 of Figure 3, looking in the direction of the arrows.
Figure 5 is a developed view of certain channels in the control mechanism of Figures 3 and 4.

Figures 3, 4 and 5 show the details of one illustrative embodiment of my invention, indicated in general by A, which letter has been heretofore used to indicate equivalent mechanism.

My hydraulic means for ratio setting comprises essentially the following parts—a movable control element adapted for manual control or for operation by automatic means such as a thermostat, and requiring very little power for its adjustment; second, a moving member, coupled to the pinion 54 of the transmission or other devices, and the position of which at any instant is determined by the setting of the control member; thirdly, a control element operated by solenoid 20, hereinbefore described, and responsive in its operation to conditions of power input into the prime mover. This last named means is adapted, when in operation, to render the action of the manual control member ineffective, and to cause the moving member to move into such a position as to secure the lowest ratio of transmission.

The manual control member is indicated at 56 and is shown as in the form of a cylindrical plug provided with two angularly formed passages, 58 and 60 respectively, terminating on the periphery of the plug 56 in vertically extending grooves 62 and 64.

The inlet portion of passage 58 is connected to radial passages 66 communicating with an annular groove 68 provided on the periphery of the plug 56, and this annular groove 68 is at all times in communication with a passage 70, this passage being located in the casing hereinafter to be described, surrounding the plug 56, and connected to a hydraulic power source, such as oil under pressure. It will be observed that by this system the passage 58 is at all times in communication with duct 70, and is therefore supplied with oil under pressure no matter what the angular position of the plug 56 is, unless, as will be hereinafter described, the flow of oil is interrupted by the action of solenoid 20.

The passage 60 terminates at one end in the groove 64, as has already been described, and at its other end it communicates with passage 72 located in the portion 77 of the movable parts surrounding the plug 56, to be described hereinafter, and venting externally so that thereby the passage 60 may be drained.

The movable ratio setting member is constituted by a cylinder 74 adjustably surrounding the plug 56 and in liquid-tight contact therewith. Attached to cylinder 74 is a vane 76, and carried by an extension 77 thereof is the pinion 54, which by engagement with the rack 52 on member 50, heretofore described, effects the setting of the speed ratio of the transmission by the tilting of the rollers of the transmission.

Also, connected to the extension 77 of cylinder 74 is one end of a spiral spring, 78, which normally tends to urge the cylinder and its attached vane 76 in a clockwise direction as seen in Figure 3, the other end of the spring for this purpose being fixed to the stationary outer casing 92, to be hereinafter described.

Within the bore of cylinder 74, on the inner wall thereof, and on the same level as the hereinbefore mentioned grooves 62 and 64, are channels 80 and 82 which extend almost halfway around the cylinder and are separated from each other by partitions 84 and 86 which are of the same width as the grooves 60 and 62 and are adapted to register simultaneously therewith and to cover them up completely. The channels 80 and 82 if they were not separated from each other by the partitions 84 and 86 would constitute a single annular groove running completely around the inner wall of said cylinder. It has been stated that the grooves 60 and 62 are positioned so as to register with the partitions 84 and 86 and for this purpose they are located on opposite sides of the plug 56. This positioning in opposition is found to be convenient, although it is not necessary for all purposes to have the 180° spacing, so long as the grooves 62 and 64 are adapted to register with the partitions 84 and 86 within certain limits of adjustment of the plug 56. A correct picture of these parts may be obtained from Figure 5, in which channels 80 and 82 are shown in developed form.

Located within vane 76 and disposed respectively on opposite sides of the mid-portion thereof, and at different levels, are two passages 88 and 90, the particular function of which is to establish communication between the channels 80 and 82 and the opposite sides of the vane 76, for the purpose to be hereinafter described.

The moving vane 76 is adapted for movement within a casing 92 which may at the same time constitute the main frame of the hydraulic ratio setting mechanism and the inner wall of which is cylindrical as shown at 94. The cylinder 74 and the vane 76 are adapted to move within said casing, and the latter has liquid-tight contact with the inner walls thereof, so that the vane 76 separates the interior of said casing into two chambers 98 and 100 of variable extent. Each of these chambers is provided with an abutment 96, limiting the motion of the vane. Chamber 100 is provided with an outlet 102 normally covered by a plunger 104, but adapted when uncovered by motion of the plunger upward to communicate with the discharge port 106. Through this system of outlets fluid may be discharged from the chamber 100.

The plunger 104 moves within the cylindrical bore 105, which it is adapted to engage in liquid-tight contact and it carries at its mid-portion a by-pass in the form of the annular groove 106. When groove 106 registers with the passage 70, it is adapted to connect the same with the duct 108 which is in communication with a source of oil under pressure. The plunger 104 is connected to the armature 22, by means of rod 110 and is urged upwards by the spring 24, so that when the solenoid 20 is de-energized, it will move upward in the cylindrical bore 105 thereby uncovering the port 102 and discharging the chamber 100 through the ports 102 and 107, the latter discharging at some point external to casing 92 and preventing the admission of oil into the passage 70 because the by-pass 106 no longer registers with said passage; instead it is covered by the plunger 104. When, however, the solenoid 20 is energized, it will pull rod 110 and plunger 104 against the action of spring 24 and thereby close up the discharge port 102 and cause the by-pass 106 to register with passage 70, thereby admitting oil under pressure thereinto.

The operation of this embodiment of my invention will now be explained. We assume first of all that the controlling plug 56 has been set for a desired speed ratio and that the solenoid 20 is assumed as energized, that is, the motor is operating normally and the load is being driven at a speed determined by the setting of plug 56. As a consequence of the energization of solenoid 20, the discharge port 102 is closed and oil under pressure is being admitted into passage 70. The vane 76 we will assume, for the present, to have assumed a position of stability, and to be so related to the plug 56 that the partition 86 completely covers the groove 62 and the partition 84 completely covers the groove 64. Therefore, no oil can enter the channels 80 and 82 from groove 62, and similarly since the discharge groove 64 is closed oil contained in channels 80 or 82 cannot escape. Since channel 80 communicates with chamber 98 and channel 82, with chamber 100, these chambers are also closed against admission or discharge of oil.

We assume next that the setting of plug 56 is changed as by turning it clockwise. As soon as this takes place, oil enters from the groove 62 into channel 80 and then into the passage 88 and from there into the chamber 98; simultaneously channel 82 is placed into communication with the groove 64 and oil contained in the chamber 100 may pass through the channel 90 into channel 82, and discharge by way of groove 64 through passage 72 connected therewith. As oil under pressure is admitted into chamber 98 it pushes the vane clockwise and forces oil out of chamber 100 until the grooves 62 and 64 are again covered by partitions 84 and 86 which occurs as a result of the motion of vane 76. At this point admission of oil into chamber 98 and discharge of oil from chamber 100 stop and the vane 76 is again in an equilibrium position. The tendency of vane 76 to be moved clockwise by spring 78 is resisted by the oil in chamber 100, which fills the chamber, and has no exit therefrom because port 102 is covered, as is also groove 64 as has just been explained.

If the plug 56 is now adjusted counter-clockwise, oil will be admitted into chamber 100 and discharged from chamber 98, and vane 76 will move counter-clockwise, adjusting the speed ratio correspondingly, until as a result of the motion of vane 76, the grooves 62 and 64 are covered by partitions 84 and 86 and the vane is again in an equilibrium position.

As a result of the movement of the vane 76, the ratio of the transmission is changed as has been heretofore described. It will therefore be obvious that each position of the plug 56 has a corresponding equilibrium position of the vane 76, and the ratio is therefore completely determined by the position of the control member, that is, plug 56.

It is to be noted that when moving counter-clockwise the vane must overcome the tendency of spring 78 to cause it to move clockwise, and as a consequence the oil pressure must be sufficiently high to overcome the force of spring 78, to effect the purpose intended.

If now the solenoid 20 should be de-energized for any of the reasons heretofore enumerated, the plunger 104 under action of spring 24 would at once move upward and close the passage between oil ducts 70 and 108, so that oil under pressure would no longer be admitted into 70, and at the same time it would establish communication between the discharge opening 102 and the port 107, and all the oil contained in the chamber 100 would be discharged. This would result in making effective the tension of spring 78, and cause vane 76 to move clockwise. After the initiation of this motion chamber 98 would also lose its oil through channels 88, 80 and groove 64. This would permit the vane 76 to move freely under the action of the spring 78, and it would not come to rest until it struck the abutment 96 in chamber 100. This position of the vane, as has already been explained, corresponds to the lowest ratio setting, or the setting that is best suited for restarting of the motor. This position might correspond to a positioning of members 50 at the extreme left in Figure 4, it being remembered that movement of vane 76 is communicated thereto by rack 52 and pinion 54 carried by extension 77 of cylinder 74 on which vane 76 is mounted.

As soon as the motor has been restarted by throwing the switch 16, the solenoid 20 is again energized and pulls down the plunger 104 thereby uncovering the oil pressure passages 108 and 70 and closing the discharge opening 102. As the oil flows into the passage 70, into the groove 62, and from the groove 62 through the passage 90 into the chamber 100, the vane will move counter-clockwise against the action of spring 78 until, as a result of the motion of vane 76, the partition 86 covers up the groove 62. In the meantime, oil from chamber 98 has been discharging into the passage 88, and thence ultimately out of the system through passage 72, and this discharge is halted by the closing of groove 64 due to the motion of the vane. When the vane again becomes stationary, it will be in the identical position that it was in before the action of solenoid 20 began. This is obvious, when it is remembered that the position of vane 76 is determined by the position of plug 56, and the setting of this plug has not been altered. In other words, automatic resetting action takes place without any manual control on the part of the attendant, but solely by throwing the switch so as to again supply the motor with power.

In order to adjust plug 56, the same is provided at its upper end with an extension 112 carrying worm-wheel 114, adapted for actuation by worm 116. If desired, an indicating device 120 may be provided, which may be carried on shaft 118 secured to extension 112, and indicating the position of plug 56, and consequently the setting of the speed ratio.

Figure 6:
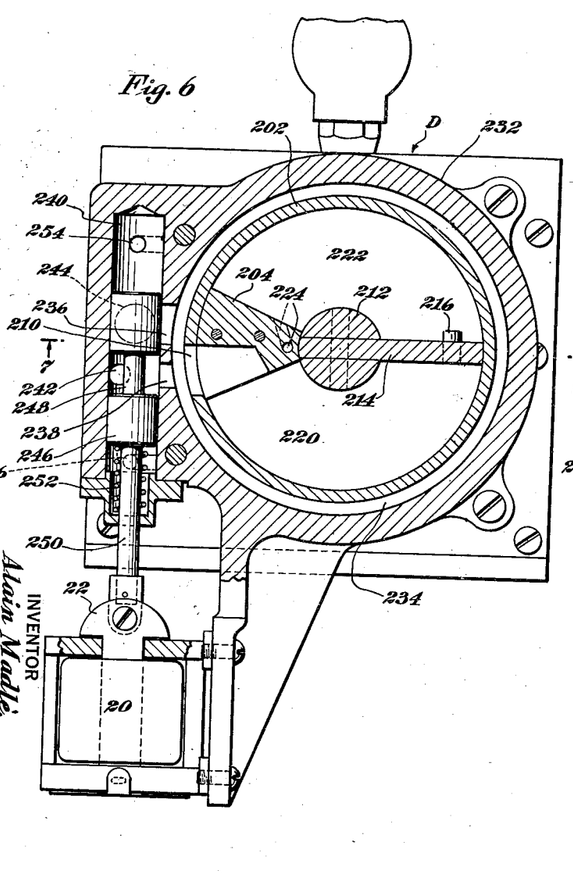
Figure 6 is a sectional view, on the line 6—6 of Figure 7 of a modified form of hydraulic ratio setting control means.
Figure 7:
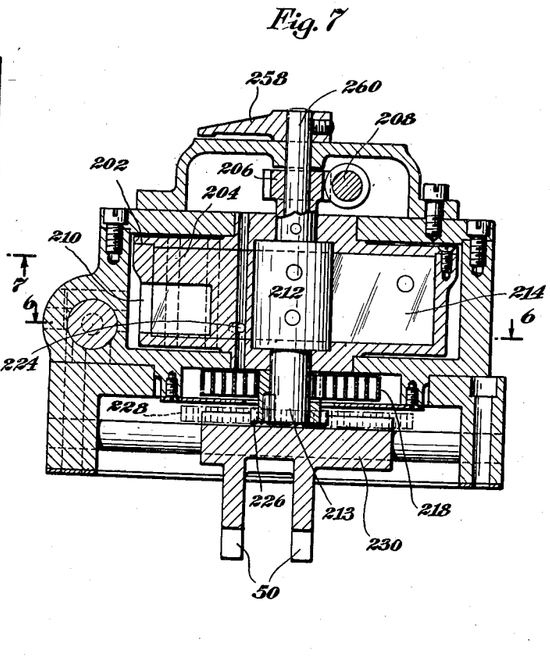
Figure 7 is a sectional view of the same on the line 7—7 of Figure 6, looking in the direction of the arrows.

A second form of automatic hydraulic speed ratio control means is shown in Figures 6 and 7. In said figures, the solenoid is denoted as before by 20, and its armature by 22. The hydraulic mechanism is indicated as a whole by D. In this embodiment of my invention the manually controlled setting member takes the form of a hollow drum 202, carrying within it a fixed vane 204, and having an outlet port 210. The setting of this control member is effected by worm-wheel 206 and the manually controlled worm 208. Freely rotatable in relation to said control member 202 and mounted coaxially therein, is the element 212 having an extension 213 to which is connected the spiral spring 218 which is arranged so as to move the element 212 counter-clockwise. A vane 214 is carried in fixed relation by the element 212 and is provided with a stop member 216 serving as an abutment therebetween and the fixed vane 204. This vane is in liquid-tight contact with the inner surface of the control member 202, which thereby is divided into two compartments, one of which, 220, is adapted to be filled with oil under pressure through the port 210, of the control member, while the other is in communication with the outside of the casing through the vent 224. When oil is admitted into the chamber 220, it serves to move the vane 214 counter-clockwise, thereby tensioning the spring 218 which urges the vane 214 clockwise.

The extension 213 carries at its lower end a pinion 226 which meshes with a rack 228 on the shifting carriage 230, which carries members 50, the function of which is to tilt the rollers 42, as previously described, when the spring 218 moves the rack and shifting carriage 230 to the left hand end of Figure 7, which corresponds to the low ratio position. When, however, oil is admitted into the chamber 220 the vane 214 is moved counter-clockwise with the result of shifting the carriage 230 to the right hand end or high ratio position.

The control member 202 is surrounded by the casing 232 which is also shown as a hollow cylinder, although the cylindrical shape is not necessary to its proper functioning. The control member 202 has its outer wall spaced from the casing 232, as indicated at 234, so that the port 210 always communicates with the space 234 no matter what the position of the control member, and the casing 232 is provided with an inlet 238 and an outlet 236, which communicate with the cylindrical valve chamber 240 and thereby the chamber 220 and the space 234 may be either filled with oil or emptied thereof.

The cylinder 240 is provided with an oil inlet opening 242 and with an outlet opening 244, and within it moves the plunger 246 provided with a by-pass, in the form of an annular groove 248, at its mid-portion, and which is connected by the rod 250 to the armature 22 of the solenoid.

Cylinder 240 is further provided with vent openings 254 and 256 which permit free motion of the plunger upwards against the pull of solenoid 20 and downwards against the pressure of spring 252 within the cylinder, without air or oil leakage being entrapped in the cylinder ends.

When the plunger 246 moves upward under the action of spring 252 it puts in communication the outlet opening 236 in the casing with the outlet opening 244 in the cylinder 240, so that any oil within the casing 232 and within the chamber 220 may discharge thereinto. This permits the spring 218 to move the vane 214 in a clockwise direction. When, on the other hand, the plunger 246 is moved downward against the action of spring 252, by the solenoid 20, it closes the outlet opening 244 and puts into communication the oil supply opening 242, the inlet opening 238 and the port 210, so that oil enters the chamber 220 and forces the vane 214 counter-clockwise against the action of spring 218. The vane 214 will not come to rest until its abutments 216 strike the control vane 204. The chamber 222 during this motion of vane 214 is vented through the opening 224.

The operation of this embodiment of my invention is quite similar to that of the other embodiment heretofore described. Manual control is effected by positioning vane 204 as desired, and since the solenoid 20 is normally energized when the motor is operating, so that the oil admission ports are open, oil will be admitted into the chamber 220 and force the moving vane 214 into a position in abutment with the vane 204, which will have the effect of correspondingly setting the transmission ratio. When solenoid 20, however, is de-energized, the oil in chamber 220 is discharged, and the vane 214 moves clockwise, under the action of spring 218, thereby moving the control member 230 to the left of Figure 7, that is to say, into the lowest ratio position.

When conditions again become normal and the current is thrown on by switch 16, the solenoid 20 will again be energized, and will open the oil passage admitting oil into the chamber 220, thereby forcing the movable vane 214 into contact with fixed vane 204; that is to say, again into its position of setting before the interruption due to the deenergization of solenoid 20 took place.

An indicator 258 may be conveniently provided to move together with the control member 202 to indicate the ratio setting, and may be connected thereto by the pin 260.

While I have shown and described my invention in several illustrative forms, it is to be understood that the details thereof may be varied and related in many other ways and that the invention may be embodied in many other forms, all as will be obvious to those skilled in the art, without departing from the spirit of my invention as defined in the appended claims, and the disclosure herein is therefore to be interpreted as illustrative merely, and not in a limiting sense.

Having thus described my invention and illustrated its use, what I claim as new and desire to secure by Letters Patent is:

1. In combination, a prime mover for driving a load, a variable speed ratio power transmission intermediate said prime mover and said load, a source of power for said prime mover, means responsive to pressure conditions in the source of power for altering the speed ratio of the power transmission so as to lower it when such pressure drops, and means responsive to the flow of power into the prime mover and adapted to set the speed ratio of the transmission so as to lower it when the flow of power into the prime mover exceeds a predetermined maximum.

2. In combination, an electric motor driving a load through a variable speed transmission, means responsive to the voltage at the terminals of said motor to automatically lower the speed ratio of the transmission when the voltage drops below a predetermined minimum, and means responsive to the current input into the motor to automatically lower the speed ratio of the transmission when the current exceeds a predetermined maximum.

3. In combination, an electric motor driving a load through a variable speed transmission, means responsive to the voltage at the terminals of said motor to automatically lower the speed ratio of the transmission when the voltage drops below a predetermined minimum, and means responsive to the current input into the motor to automatically lower the speed ratio of the transmission when the current exceeds a predetermined maximum, and means to automatically restore the original ratio setting when said voltage returns above said minimum or the current drops below said maximum.

4. For use in setting the speed ratio of a variable power transmission for transmitting power from a prime mover to a load, said prime mover receiving power through a power supply line, an adjustable control member, a ratio setting element, means for causing said element to position itself in a predetermined relation to said member, and means responsive to predetermined conditions in the power supply line to interrupt the functioning of said first mentioned means, and means for causing said element to move into the position of lowest ratio setting when said means responsive to predetermined conditions in the power supply line interrupts the functioning of said first means.

5. Means for setting the ratio of a variable speed power transmission for transmitting power from a source of power to a load, comprising a manually adjustable control member, a pair of ducts within the same, a passage adapted to register with one of said ducts and to supply a liquid under pressure to the same, and another passage adapted to register with the other of said ducts and to permit the discharge of fluids within the same, a liquid-tight chamber surrounding said control member and having the inner walls thereof forming, together with a wall of the control member, a space of uniform cross-section, a vane in liquid-tight contact with the walls of said space and adapted to movably obstruct said space and to divide said chamber into two portions of complementarily variable extent, each of said chambers being provided with stop means for limiting the movement of said vane, said vane carrying means for adjusting the speed ratio of the transmission and means provided with separated channels adapted to register with the aforementioned ducts and to simultaneously establish communication between one of said chambers and one of said ducts and the other of said chambers and the other of said ducts, whereby liquid under pressure will be admitted into one chamber and will be permitted to discharge from the other chamber, and whereby the vane will be caused to move into an equilibrium position in relation to said control member, motion-causing means acting on said vane to cause it to move against the stop of one of said chambers and to thereby set the speed ratio into its minimum position, said last mentioned chamber having a discharge opening, and valve means adapted to be energized from the source of power to close said discharge opening and to admit liquid under pressure into the aforementioned passage and into its registering duct, when so energized, and, when de-energized to open said discharge opening and to shut off the flow of liquid into said passage, whereby said motion-causing means will be free to move said vane against the said stop and into a position to set the mechanism to its lowest ratio.

6. Mechanism for setting the speed ratio of variable speed power transmissions positioned intermediate a source of power and a load comprising a liquid-tight chamber, a manually adjustable control member positioned therewithin, means for adjusting the ratio of the transmission, said means including a movable element dividing said chamber into two liquid-tight portions and adapted normally to assume a position in which the speed ratio is the minimum possible for the transmission, cooperating means within said chamber and said element whereby liquid under pressure may be admitted selectively into either portion of said chamber and to discharge from the other portion, so as to cause said element to assume a predetermined position in relation to said member, and means responsive to predetermined conditions at the source of power for interrupting the functioning of said cooperating means.

7. Mechanism for setting the speed ratio of variable speed power transmissions comprising a liquid-tight chamber, a manually adjustable control member positioned therewithin, means for adjusting the ratio of the transmission, said means comprising a movable element dividing said chamber into two liquid-tight portions and adapted normally to assume a position in which the speed ratio is the minimum possible for the transmission, and cooperating means within said member and said element whereby liquid under pressure may be admitted selectively into either portion of said chamber and to discharge from the other portion, so as to cause said element to assume a predetermined position in relation to said member.

8. Mechanism for controlling the ratio setting of a variable speed power transmission adapted to be interposed between a prime mover, energized from a power line, and a load driven thereby, said mechanism comprising an adjustable control member in the form of a hollow cylindrical chamber having a fixed vane therewithin, a movable vane within said control member and adapted to divide the same into two complementary portions of variable extent, so that they are sealed against the passage of liquid from one area to another, a liquid-tight casing surrounding said control member and provided with an inlet opening and an outlet opening, said chamber being provided with openings, one of which is positioned on each side of said movable vane, and one of which communicates with the interior of the casing while the other provides an external vent, and an element adapted to be energized from said power line and when so energized to uncover said inlet opening and establish communication between the same and a source of liquid under pressure and simultaneously to close said outlet opening whereby liquid under pressure will be admitted into one of said portions of said control member and will cause said movable vane to move against said fixed vane because of the liquid pressure thereagainst and adapted, when de-energized, to open said outlet opening and close said inlet opening, whereby liquid in said last mentioned portion of the control member may be discharged, said movable vane being connected with the ratio setting mechanism and being urged against the fixed vane in a direction opposed to the liquid pressure thereon by resilient means, whereby when said outlet opening is open, the vane will be caused to move under the action of said spring to discharge the liquid from said control member and to adjust said transmission to its lowest speed ratio setting, and when said liquid is admitted to the control member to cause said vane to move against the action of said resilient means into a ratio setting determined by the position of said control member.

9. Mechanism for controlling the ratio setting of a variable speed power transmission adapted to be interposed between a prime mover, energized from a power line, and a load driven thereby, said mechanism comprising an adjustable control member in the form of a hollow cylindrical chamber having a fixed vane therewithin, a movable vane within said control member and adapted to divide the same into two complementary portions of variable extent, so that they are sealed against the passage of liquid from one to the other, a liquid-tight-casing surrounding said control member and provided with an inlet opening and an outlet opening, said chamber being provided with openings, one of which is positioned on each side of said movable vane, and one of which communicates with the interior of the casing while the other provides an external vent, said movable vane being adapted by its motion to set the speed ratio, and means adapted to urge said movable vane into a position of minimum speed ratio, said inlet opening in said casing adapted to be brought into communication with a source of liquid under pressure when the outlet opening therein is closed, whereby when said liquid is admitted into said casing, it will enter one of the portions of said chamber and thereby cause said moving vane to move against said fixed vane and set the ratio of the transmission as determined by the position of said fixed vane.

10. In combination with a prime mover, a speed ratio setting means for a variable speed ratio power transmission, a setting element adapted to set the speed ratio of the transmission to its lowest figure when the power input into said prime mover is interrupted, a manually adjustable control member for adjusting the ratio of the transmission under predetermined conditions, and means adapted to become operative when the pressure causing the inflow of power into the prime mover exceeds a predetermined minimum to cause said setting means to assume a predetermined relation to said control member.

11. In combination, a prime mover adapted to draw power from a power source, a variable speed power transmission intermediate said prime mover and the load it is adapted to drive, and means adapted to set the ratio of said power transmission to a minimum when the pressure causing the power to flow into said prime mover falls below a predetermined minimum and means adapted, when the flow of power into said prime mover exceeds a predetermined maximum, to render said first mentioned means operative and thereby to cause it to set the ratio of the transmission to its minimum.

12. Control means for variable speed transmission comprising a control member, yielding means operable to shift said control member toward low ratio positions, a source of fluid under pressure to shift said control member toward high ratio positions, a movable manually operable stop to predetermine limiting positions of said control member, said stop comprising a cup rotatable within a hollow housing, said cup formed with an opening in its wall communicating with an annular space between the cup and housing and having an internal radial abutment, said control member being located within said cup and movable to engage said abutment, together with passages within said housing to afford inlet of fluid under pressure to said annular space and to permit exhaust therefrom.

13. Control means for variable speed transmission comprising a control member, yielding means operable to shift said control member toward low ratio positions, a source of fluid under pressure to shift said control member toward high ratio positions, a movable manually operable stop to predetermine limiting positions of said control member, said stop comprising a cup rotatable within a hollow housing, said cup formed with an opening in its wall communicating with an annuluar space between the cup and housing and having an internal radial abutment, said control member being located wtihin said cup and movable to engage said abutment, together with passages within said housing to afford inlet of fluid under pressure to said annular space and to permit exhaust therefrom, said housing having a bore and a piston therein controlling said passage.

14. Control means for variable speed transmission comprising a control member, yielding means operable to shift said control member toward low ratio positions, a source of fluid under pressure to shift said control member toward high ratio positions, a movable manually operable stop to predetermine limiting positions of said control member, said stop comprising a cup rotatable within a hollow housing, said cup formed with an opening in its wall communicating with an annular space between the cup and housing and having an internal radial abutment, said control member being located within said cup and movable to engage said abutment, together with passages within said housing to afford inlet of fluid under pressure to said annular space and to permit exhaust therefrom, said housing having a bore and a piston therein controlling said passage together with a solenoid and a spring to oppositely move said piston.

15. In a power system in which a prime mover drives a load through a variable speed power transmission, a manually adjustable control member for pre-setting and holding the variable speed ratio of said transmission at a definite value during normal operation of the prime mover, means adapted on the stoppage of the prime mover to automatically shift the speed ratio of the transmission from the pre-set value at the time of stoppage to a value adapted for starting conditions, and means adapted on starting the prime mover to automatically shift the speed ratio from said starting value to said pre-set definite value.

16. In a power system in which a prime mover drives a load through a variable speed power transmission, a manually adjustable control member for pre-setting and holding the variable speed ratio of said transmission at a definite value, hydraulic means adapted on the stoppage of said prime mover to automatically shift the speed ratio of the transmission from its pre-set value to a value adapted for starting conditions, said hydraulic means being also adapted on starting said prime mover to automatically shift the speed ratio of the transmission from said starting value to the said pre-set value held by said adjustable control member.

17. A power system comprising an electric motor, a load, and a variable speed power transmission intermediate said motor and said load, means for setting the speed ratio of the transmission, resilient means tending to move the speed ratio setting to its starting position, electric means rendering said resilient means ineffective and adapted when the flow of current into said motor exceeds a predetermined maximum to release said resilient means to lower the speed ratio setting, and means cooperating with said electric means adapted to restore the speed ratio of the transmission to its original setting when said current flow, after exceeding said predetermined maximum, drops below said maximum.

ALAIN MADLÉ.